US 7,546,592 B2

(12) United States Patent
Martin

(10) Patent No.: US 7,546,592 B2
(45) Date of Patent: Jun. 9, 2009

(54) SYSTEM AND METHOD FOR OPTIMIZED SWING MODULO SCHEDULING BASED ON IDENTIFICATION OF CONSTRAINED RESOURCES

(75) Inventor: Allan Russell Martin, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 11/186,427

(22) Filed: Jul. 21, 2005

(65) Prior Publication Data

US 2007/0022415 A1 Jan. 25, 2007

(51) Int. Cl.
*G06F 9/45* (2006.01)
(52) U.S. Cl. .................. 717/151; 717/160; 717/161
(58) Field of Classification Search ......... 717/131–161; 702/183
See application file for complete search history.

(56) References Cited

U.S. PATENT DOCUMENTS

| | | | | |
|---|---|---|---|---|
| 5,491,823 | A * | 2/1996 | Ruttenberg | 717/161 |
| 5,664,193 | A * | 9/1997 | Tirumalai | 717/153 |
| 5,809,308 | A * | 9/1998 | Tirumalai | 717/161 |
| 5,867,711 | A | 2/1999 | Subramanian et al. | 395/709 |
| 5,930,510 | A | 7/1999 | Beylin et al. | 395/709 |
| 6,438,747 | B1 | 8/2002 | Schreiber et al. | 717/160 |
| 6,671,878 | B1 | 12/2003 | Bliss | 717/161 |
| 6,832,370 | B1 * | 12/2004 | Srinivasan et al. | 717/161 |
| 7,089,403 | B2 * | 8/2006 | Pechtchanski et al. | 712/216 |
| 2002/0007484 | A1 * | 1/2002 | Tirumalai et al. | 717/9 |
| 2003/0171907 | A1 | 9/2003 | Gal-On et al. | 703/14 |
| 2003/0208749 | A1 * | 11/2003 | Rajagopalan | 717/158 |
| 2003/0237080 | A1 | 12/2003 | Thompson et al. | 717/161 |
| 2004/0003384 | A1 * | 1/2004 | Pechtchanski et al. | 717/158 |
| 2004/0068718 | A1 | 4/2004 | Cronquist et al. | 717/151 |

OTHER PUBLICATIONS

Lifetime-sensitive modulo scheduling in a production environment, Llosa, J.; Ayguade, E.; Gonzalez, A.; Valero, M.; Eckhardt, J.; IEEE, vol. 50, Issue 3, Mar. 2001 pp. 234-249.*
Swing module scheduling: a lifetime-sensitive approach, Llosa, J.; Gonzalez, A.; Ayguade, E.; Valero, M.; IEEE, Oct. 1996, pp. 80-86.*
Profile-driven instruction level parallel scheduling with application to super blocks, Chekuri, C.; Johnson, R.; Motwani, R.; Natarajan, B.; Ran, B.R.; Schlansker, M.; IEEE, 1996, pp. 58-67.*
Dynamically scheduling VLIW instructions with dependency information, Sunghyun Jee; Palaniappan, K.; IEEE, 2002, pp. 1-9.*
Macro-op scheduling: relaxing scheduling loop constraints, Kim, I.; Lipasti, M.; IEEE, 2003, pp. 1-12.*

* cited by examiner

*Primary Examiner*—Wei Y Zhen
*Assistant Examiner*—Satish Rampuria
(74) *Attorney, Agent, or Firm*—Yee & Associates, P.C.; Libby Z. Handelsman

(57) ABSTRACT

A method, computer program product, and a data processing system for scheduling instructions in a data processing system are provided. Dependencies among a plurality of nodes are analyzed to determine if any of the plurality of nodes uses a constrained resource. Each of the plurality of nodes represents an instruction in a set of instructions. A subset of the plurality of nodes is designated as resource-constrained nodes. An attempt is made to generate a schedule with the subset of the plurality of nodes scheduled with priority with respect to any of the plurality of nodes not included in the subset.

17 Claims, 4 Drawing Sheets

| NODE | LABEL | INSTRUCTION |
|---|---|---|
| 1 | LOAD | gr1 |
| 2 | MULT | gr2=gr1*16 |
| 3 | ADD | gr4=gr2+1000 |
| 4 | LOAD | fp1=addr_x(gr4) |
| 5 | FPMULT | fp2=fp1*2.5 |
| 6 | FPADD | fp4=fp2+fp3 |
| 7 | FPMULT | fp5=fp4*fp1 |
| 8 | FPADD | fp6=fp5+fp4 |
| 9 | FPMULT | fp7=fp6*fp5 |
| 10 | FPADD | fp8=fp7+fp5 |
| 11 | STORE | fp8 |
|  | BRANCH | LABEL |

FIG. 5

| CYCLE | NODES PLACED IN CYCLE | CYCLE | NODES PLACED IN CYCLE | CYCLE | NODES PLACED IN CYCLE | CYCLE | NODES PLACED IN CYCLE |
|---|---|---|---|---|---|---|---|
| 0 | 1 | 6 | 4 | 12 |   | 18 |   |
| 1 |   | 7 |   | 13 | 7 | 19 |   |
| 2 | 2 | 8 | 5 | 14 |   | 20 |   |
| 3 |   | 9 |   | 15 | 8 | 21 |   |
| 4 | 3 | 10 | 6 | 16 |   | 22 |   |
| 5 |   | 11 |   | 17 | 9 | 23 |   |

| CYCLE | NODES PLACED IN CYCLE | CYCLE | NODES PLACED IN CYCLE | CYCLE | NODES PLACED IN CYCLE | CYCLE | NODES PLACED IN CYCLE | CYCLE | NODES PLACED IN CYCLE |
|---|---|---|---|---|---|---|---|---|---|
| -6 |   | 0 |   | 6 |   | 12 |   | 18 | 10 |
| -5 |   | 1 | 2 | 7 | 5 | 13 |   | 19 |   |
| -4 |   | 2 |   | 8 |   | 14 | 8 | 20 | 11 |
| -3 |   | 3 | 3 | 9 | 6 | 15 |   | 21 |   |
| -2 | 1 | 4 |   | 10 |   | 16 | 9 | 22 |   |
| -1 |   | 5 | 4 | 11 | 7 | 17 |   | 23 |   |

700

SYSTEM AND METHOD FOR OPTIMIZED SWING MODULO SCHEDULING BASED ON IDENTIFICATION OF CONSTRAINED RESOURCES

BACKGROUND OF THE INVENTION

1. Technical Field

The present invention relates generally to an improved data processing system and in particular to a method and computer program product for optimizing software pipelining. Still more particularly, the present invention provides a method and computer program product for identifying constrained resources in a loop and modifying a swing modulo schedule based on the identified constrained resources.

2. Description of Related Art

Software pipelining is a compiler optimization technique for reordering the hardware instructions within a computer program loop being compiled such that the number of cycles required for each iteration of the loop is minimized. Particularly, software pipelining seeks to optimize the number of required cycles for execution of the loop by overlapping the execution of different iterations of the loop.

Modulo scheduling is a technique for performing software pipelining. A modulo scheduling algorithm selects a likely minimum number of cycles that the loop may be executed in, often called a minimum initiation interval, and places instructions into a schedule of that size. Instructions are "wrapped" around the end of the loop into the next iterations(s) until all instructions are scheduled. If the number of cycles exceeds the initiation interval, the initiation interval may then be incremented and a schedule having a number of cycles corresponding to the initiation interval is attempted to be found.

Swing modulo scheduling (SMS) is a specific modulo scheduling algorithm designed to place instructions into the schedule in such a way that the schedule is nearly optimal in number of cycles, length of schedule, and registers used. SMS comprises three general steps: building a data dependency graph (DDG), ordering nodes of the DDG, and scheduling nodes.

The DDG graph is analyzed to find strongly connected components (SCCs). SCC are graph components which are cyclic data dependencies. Various parameters, such as height, depth, earliest time, latest time, and slack of each node (where a DDG node corresponds to an instruction) are then determined.

Node ordering of the DDG is performed based on the priority given to groups of node such that the ordering rows out from a nucleus of nodes rather than starting two group of nodes and connecting them together. An important feature of this step is that the direction of ordering works in both the forward and backward direction so that nodes are added to the order that are both predecessors and successors of the nucleus of previously ordered nodes. When considering the first node, or when an independent section of the graph is finished, the next node to be ordered is selected based on its priority (using minimum earliest time for forward direction and maximum latest time for backward direction). Then, nodes that are predecessors and successors to the pool of nodes are added to the ordering such that whenever possible nodes that are added only have predecessors or successors already ordered, not both.

The SMS algorithm for performing scheduling of the nodes evaluates the nodes in the order generated as previously described and places the node as close as possible (while respecting scheduling latencies) to its predecessors and successors. Because the order selecting in the node order can change directions between moving backward and forward, the nodes are scheduled such that they are an appropriate number of cycles before successors or after predecessors.

One of the most difficult types of loops to schedule is when one particular machine resource is heavily used by a large number of instructions in a loop. Examples of possible types of constrained resources are a particular hardware execution unit, or a class of registers. Scheduling loops when one particular machine resource is heavily used by a large number of instructions in the loop is particularly problematic with a conventional SMS algorithm implementation. Most loops in computer programs can be considered resource constrained since most loops consume one type of machine resource more heavily than other types. As referred to herein, these types of loops are called "resource constrained" because the heavy usage of a particular resource makes it difficult to freely place instructions that use that resource into a schedule. Instructions represented by nodes in the DDG can be said to be resource constrained if they make use of the resource that is heavily used for a particular loop.

It is often difficult to schedule resource constrained loops in an optimal number of cycles due to the contention for the constrained resource using a conventional SMS algorithm. The high contention for a particular resource often results in nodes not being placed in an optimal location in the schedule which can lead to schedules that are less than optimal in terms of number of cycles and register usage.

Thus, it would be advantageous to provide a mechanism for optimizing an SMS algorithm. It would further be advantageous to provide a mechanism for optimizing instructions scheduling based on instruction contention for constrained resources.

SUMMARY OF THE INVENTION

The present invention provides a method, computer program product, and a data processing system for scheduling instructions in a data processing system. Dependencies among a plurality of nodes are analyzed to determine if any of the plurality of nodes use a constrained resource. Each of the plurality of nodes represents an instruction in a set of instructions. A subset of the plurality of nodes is designated as resource-constrained nodes. An attempt is made to generate a schedule with the subset of the plurality of nodes scheduled with priority with respect to any of the plurality of nodes not included in the subset.

A first aspect provides a method of scheduling a set of instructions in a data processing system, the method comprising the computer implemented steps of: analyzing dependencies among a plurality of nodes to determine if any of the plurality of nodes use a constrained resource, wherein each of the plurality of nodes represents an instruction in the set of instructions; responsive to analyzing the dependencies, designating a subset of the plurality of nodes as resource-constrained nodes; and performing a scheduling attempt with the subset of the plurality of nodes scheduled with priority with respect to any of the plurality of nodes not included in the subset.

A second aspect provides a computer program product in a computer readable medium for scheduling a set of instructions in a data processing system, the computer program product comprising: first instructions that analyze dependencies among a plurality of nodes to determine if any of the plurality of nodes use a constrained resource, wherein each of the plurality of nodes represents an instruction in the set of instructions; second instructions that, responsive to the first instruction analyzing the dependencies, designate a subset of the plurality of nodes as resource-constrained nodes; and third instructions that attempt to generate a schedule that includes each of the plurality of nodes assigned to an execution cycle, wherein the subset of the plurality of nodes are assigned priority for placement in the schedule with respect to any of the plurality of nodes not included in the subset.

A data processing system for scheduling a set of instructions for execution in a data processing system, comprising: a memory containing an instruction set for scheduling the set of instructions for execution; and a processing unit, responsive to execution of the instruction set, for analyzing dependencies among a plurality of nodes each representative of one of the set of instructions, designating a subset of the set of instructions as resource-constrained, and, responsive to designation of the subset of the set of instructions, attempting to generate a schedule including each of the plurality of nodes, wherein the processing unit assigns the subset of the set of instructions to the schedule with priority over other instructions not included in the subset.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagrammatic illustration of an exemplary modulo reservation table calculated by a swing modulo scheduling routine for an example loop as is conventional and which may be optimized in accordance with a preferred embodiment of the present invention;

FIG. 7 is a diagrammatic illustration of a modulo reservation table calculated by the swing module scheduling routine described with reference to FIG. 6 in accordance with a preferred embodiment of the present invention.

DETAILED DESCRIPTION OF THE PREFERRED EMBODIMENT

Figure 1:
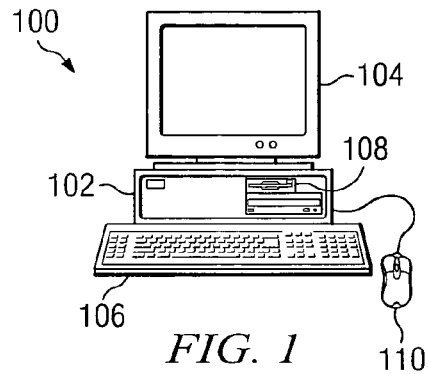
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
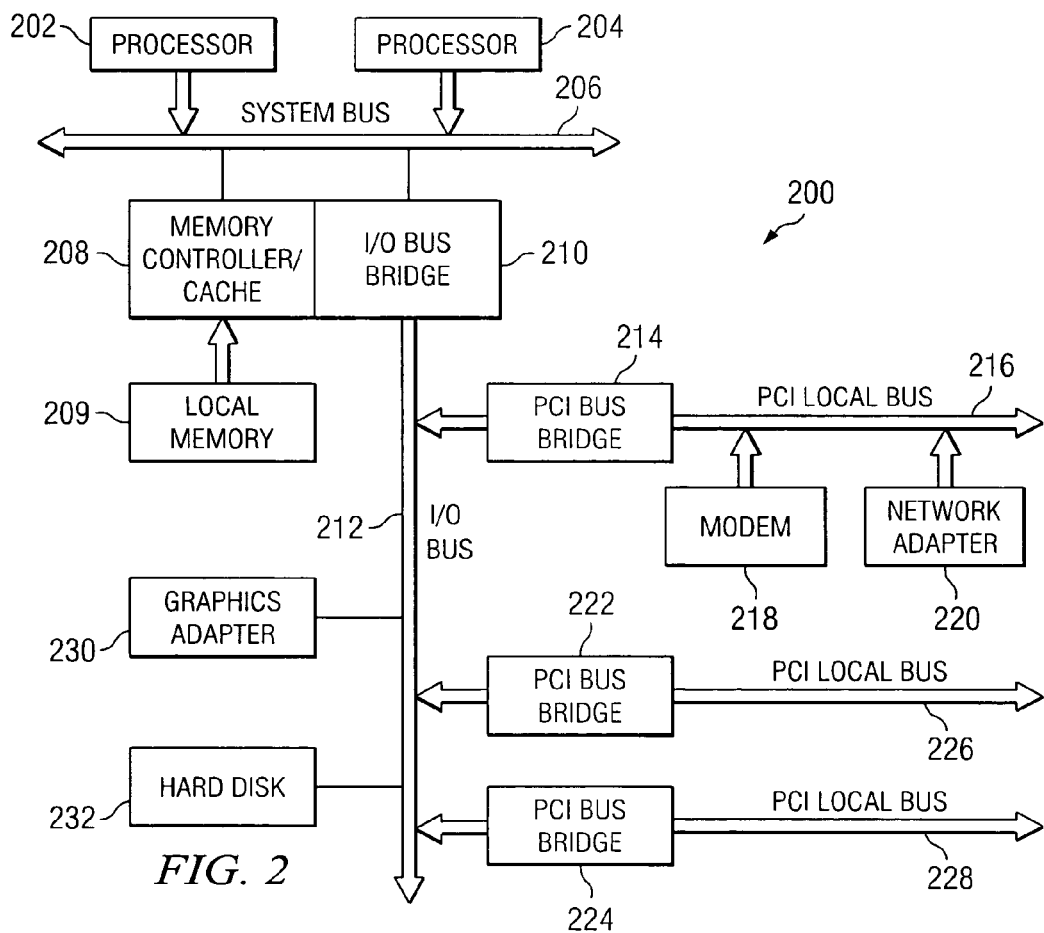
FIG. 2 is a block diagram of a data processing system in which the present invention may be implemented in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

The present invention provides a mechanism for determining the resource in a loop that is most scarce and causes the most difficult in instruction scheduling such that successive attempts to schedule the loop can give higher priority to nodes that use the resource. The invention includes a modification to the SMS ordering step that gives higher priority to both SCCs and individual nodes that use a constrained resource without comprising the prioritization of other important features of loops. The invention also includes the discovery of constrained resources by examining the reason why earlier attempts to find a schedule failed. In this scheme, the algorithm learns from previous failed scheduling attempts and uses that information to influence the priority it gives to different nodes on its next attempt to find a schedule. The invention facilitates identifying schedules for loops that are more often optimal in number of cycles and register usage. It achieves this result without a significant increase in completion time.

Figures 3, 4:
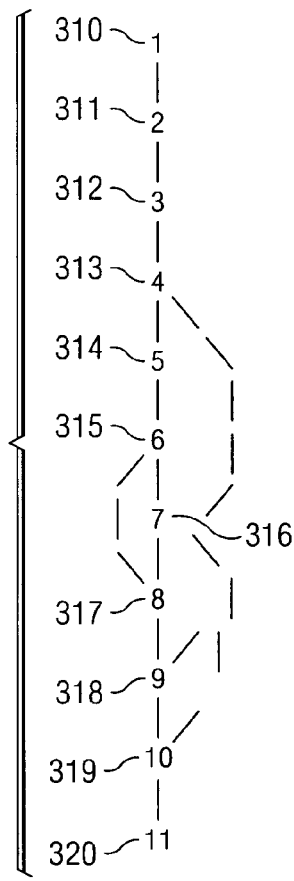
FIG. 3 is a diagrammatic illustration of an exemplary loop sequence that may be scheduled according to a preferred embodiment of the present invention.
FIG. 4 is a diagrammatic illustration of a data dependency graph for the loop shown in FIG. 3 and that may have nodes thereof initially ordered in accordance with a preferred embodiment of the present invention.

The processes of the present invention may be better understood with reference now to FIG. 3 that shows an exemplary loop sequence that may be scheduled according to a preferred embodiment of the present invention. Loop 300 comprises eleven instructions each enumerated with a node 310-320. Each node comprises an instruction operator, e.g., load, add, etc., and a corresponding instruction. In the illustrative example, a floating point register that is the object of an instruction has a prefix of "fp", and an integer register that is the object of an instruction has a prefix of "gr".

For illustrative purposes, assume the given loop sequence is compiled for execution on a processor that can process two instructions per cycle. Further assume that the processor can execute one integer instruction per cycle, one floating point instruction per cycle, and two load/store instructions per cycle. Delays between all dependent instructions are two cycles and the processor does not have rotating registers. Thus, register values longer than one loop iteration must be preserved with register copy instructions.

FIG. 4 is a diagrammatic illustration of a DDG for the loop shown in FIG. 3 and that may have nodes thereof initially ordered in accordance with a preferred embodiment of the present invention. DDG 400 comprises nodes 310-320 with node dependencies designated with dashed lines. For example, node 311 comprises the instruction to multiply (MULT) the integer register result of the node 1 result (gr1) by sixteen, and thus node 2 cannot be executed until node 1 has been executed. Accordingly, node 2 is shown connected with node 1 by a dashed line to illustrate the dependence of node 2 on node 1.

A conventional SMS algorithm may generate a node order of <1,2,3,4,5,6,7,8,9,10,11> for the above loop. The scheduling routine of the SMS algorithm would then attempt to generate a schedule with an initiation interval (II) of II=6 due to the loop having six floating point instructions and the processor having a single floating point register.

FIG. 5 illustrates an exemplary modulo reservation table calculated by an SMS scheduling routine for the example loop provided above as is conventional and which may be optimized in accordance with a preferred embodiment of the present invention. On an initial schedule attempt, the SMS scheduling routine attempts to schedule the loop for execution in six cycles due to the loop having a total of 12 nodes and the exemplary system constraint of two instructions per cycle.

Nodes 1-3 are scheduled at respective cycles 0, 2 and 4 due to the example processor limitation of a two cycle latency between dependent instructions. Node 4 is scheduled in cycle 6 and can be executed along with node 1 in this cycle since the processor can execute two load/store instructions per cycle.

Node 5 is scheduled for cycle 8 and can execute with node 2 since they use different execution units, that is since node 2 uses the integer register and node 5 uses the floating point register. Node 6 is scheduled in cycle 10 and may execute with node 3 since node 3 and node 6 use different execution units.

Node 7 is placed in cycle 13 because it cannot be placed in cycle 12 due to the limitation of 2 instructions per cycle and the algorithm has already scheduled nodes 1 and 4 for the previous cycle. Accordingly, nodes 8 and 9 are scheduled for respective cycles 15 and 17 due to the processor limitation of a two cycle latency between dependent instructions.

The SMS scheduling routine is unable to schedule node 10 in any of cycles 19-24 because none of cycles 19-24 have sufficient resources free. Particularly, node 10 comprises a floating point add (FPADD) and each of cycles 19-24 have a floating point operation previously allocated. Because the exemplary system has a processing limitation of one floating point operation per cycle, the SMS scheduling routine is unable to schedule node 10 within the six-cycle modulo reservation table. Notably, the SMS scheduling routine is unsuccessful at completing the loop schedule due to the non-floating point nodes 1-4 being placed in the schedule prior to the most constrained nodes, namely floating point nodes 5-10.

Conventional SMS scheduling routines would then attempt to schedule the loop by incrementing the number of cycles in the initiation interval, that is to say, by incrementing II to 7. The present invention improves on conventional SMS scheduling routines by identifying resource constrained nodes and prioritizing the resource constrained nodes for scheduling.

Figure 6:
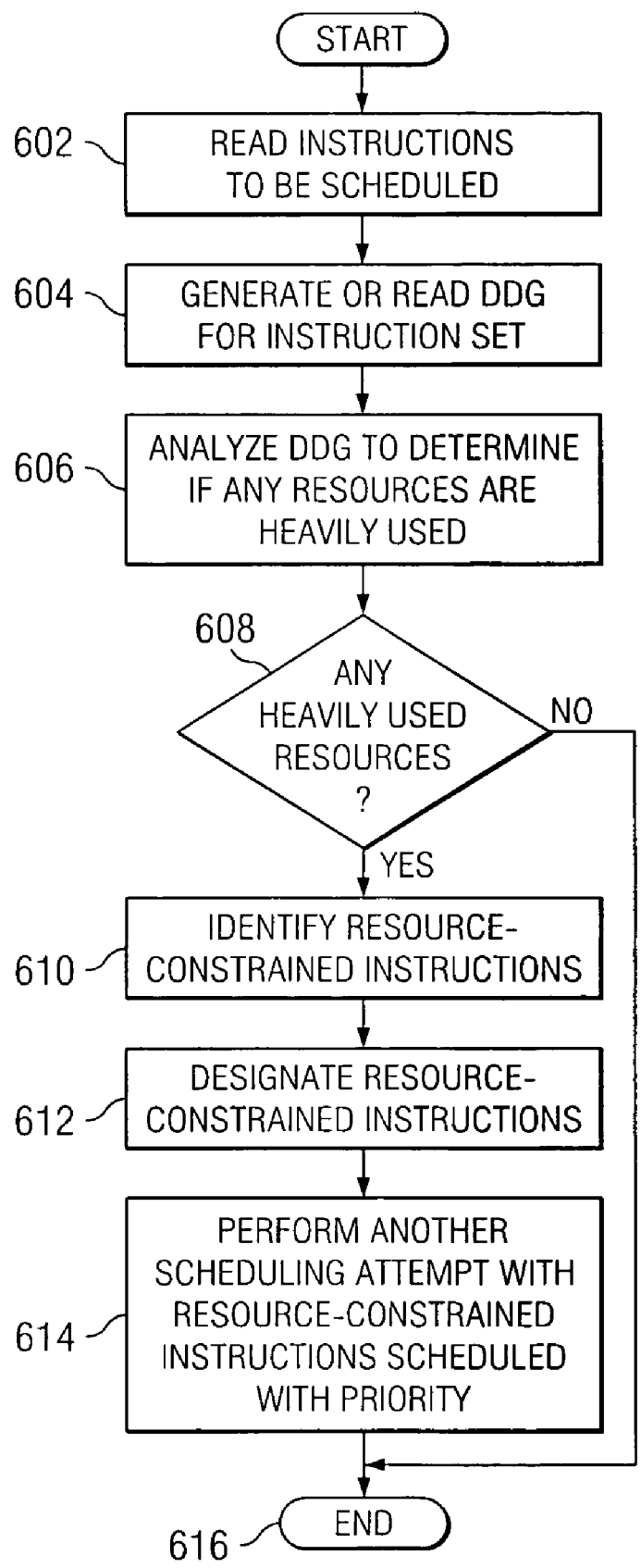
FIG. 6 is a flowchart of an swing modulo scheduling routine for optimizing node scheduling in accordance with a preferred embodiment of the present invention.

FIG. 6 is a flowchart of an SMS scheduling routine for optimizing node scheduling in accordance with a preferred embodiment of the present invention. The routine is invoked and reads an instruction set, for example the instructions comprising the loop shown and described above with reference to FIG. 3, to be scheduled (step 602). A DDG is then generated (or alternatively read from a storage device if the DDG has previously been generated) for the instruction set (step 604). The DDG is then analyzed for identification of any resources that are heavily used (step 606). For example, a static analysis may be performed to analyze the loop DDG to determine if an execution unit, e.g., a floating point execution unit, an integer execution unit or the like, is heavily used. An evaluation of the analysis of step 606 is then made to determine if any heavily used resources were identified (step 608). If no heavily used resources were identified at step 608, the scheduling routine then exits (step 616). If any resources were identified as heavily used at step 608, the scheduling routine proceeds to identify the resource-constrained instructions, i.e., instructions that make use of the heavily used resources, of the instruction set (step 610). For example, if a floating point execution unit was identified as a heavily used resource at step 608, any instructions that use a floating point execution unit are then identified as resource-constrained instructions at step 610. The scheduling routine then designates the resource-constrained instructions so that they are identifiable as such (step 612). For example, the resource-constrained instructions may be flagged or otherwise marked so that they are distinguishable from other instructions that are not resource-constrained. The scheduling routine then performs another scheduling attempt, e.g., by generating another modulo reservation table, with the resource-constrained instructions scheduled with priority (step 614). The scheduling routine cycle then ends (step 616).

With reference now to FIG. 7, an exemplary modulo reservation table calculated by the SMS scheduling routine described above with reference to FIG. 6 for the example instruction loop described above with reference to FIG. 3 is shown in accordance with a preferred embodiment of the present invention. The scheduling routine reads the loop and generates a DDG of the loop, for example DDG 400 shown and described above with reference to FIG. 4. The scheduling routine then attempts to generate a schedule with an initiation interval of II=6. The DDG is then analyzed to identify any heavily used resources. In the present example, the floating point execution unit is identified as a heavily used resource, and thus each of nodes 5-10 are marked as resource-constrained instructions and are provided precedence when scheduling the nodes.

An exemplary ordering of the nodes may then be generated as follows: <10, 9, 8, 7, 6, 5, 4, 3, 2, 1, 11> because nodes 5-10 are resource constrained. Node 10 may be selected first for scheduling of the resource constrained nodes by biasing selection of a starter node to be the highest priority of the resource constrained nodes. Accordingly, scheduling of the nodes is made as follows. Node 10 is first scheduled in cycle 18 (the earliest cycle in modulo reservation table 700 shown in FIG. 7). Nodes 16 and 14 are then assigned to respective cycles 16 and 14 to accommodate the example processor limitation of a two cycle latency between dependent instructions. The scheduling routine is unable to place node 7 in cycle 12 due to cycle 10 already having been placed in schedule 18 and of the exemplary system limitation of one floating point instruction per cycle. Thus, node 7 is placed in cycle 11. Nodes 6 and 5 are then placed in respective cycles 9 and 7 to accommodate the example processor limitation of a two cycle latency between dependent instructions. Node 4 is assigned to cycle 5 for execution with node 7 since nodes 4 and 7 use different execution units. Likewise, node 3 is assigned to cycle 3 for execution with node 6 since nodes 3 and 6 use different execution units. In a similar manner, nodes 2 and 1 are assigned to respective cycles of 1 and −2 for execution with respective nodes 5 and 9 since nodes 2 and 5 (as well as nodes 1 and 9) use different execution units. Finally, node 11 is assigned to cycle 20 for execution with node 8 since nodes 11 and 8 use different execution units.

Accordingly, nodes 1-11 are completely scheduled within the initiation interval of six cycles rather than the seven cycle schedule of a conventional SMS algorithm. By giving priority to the resource constrained nodes such that the resource-constrained nodes are ordered before other nodes that are not resource-constrained, an optimal schedule is determined. Notably, SMS prioritization by node height and depth in the graph may still be respected. Thus, the present invention may be implemented by modification of an SMS algorithm in a manner that still accounts for ordering heuristics, such as height and depth and strongly connected components, that conventional SMS algorithms utilize.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of scheduling a set of instructions in a data processing system, the method comprising the computer implemented steps of:
   reading the set of instructions;
   providing a data dependency graph comprising a plurality of nodes, wherein each node of the plurality of nodes represents one of a plurality of instructions in the set of instructions;
   analyzing the data dependency graph to determine whether any constrained resource is identified, wherein a constrained resource comprises a heavily-used resource;
   responsive to determining that any constrained resource is identified, determining whether any node of the plurality of nodes uses a constrained resource;
   responsive to determining that any node of the plurality of nodes uses a constrained resource, designating any node of the plurality of nodes that uses a constrained resource as being in a subset of nodes, wherein nodes of the subset of nodes comprise resource-constrained nodes; and
   performing a scheduling attempt with the nodes of the subset of nodes scheduled with priority with respect to any nodes of the plurality of nodes that are not included in the subset of nodes, wherein the nodes of the subset of nodes are scheduled prior to any nodes of the plurality of nodes that are not included in the subset of nodes.

2. The method of claim 1, wherein performing a scheduling attempt further comprises:
   generating a modulo reservation table.

3. The method of claim 1, further comprising:
   responsive to analyzing the data dependency graph, determining an initiation interval.

4. The method of claim 3, wherein performing a scheduling attempt further comprises attempting to schedule the plurality of nodes within a number of cycles equal to the initiation interval.

5. The method of claim 1, wherein each node of the subset of nodes requires usage of a common execution unit, wherein the execution unit comprises a register.

6. The method of claim 1, further comprising:
   biasing selection of a first node of the subset of nodes to be scheduled as a highest priority of the subset of nodes.

7. A computer program product in a recordable-type computer readable storage medium for scheduling a set of instructions in a data processing system, the computer program product comprising:
   first instructions for reading the set of instructions;
   second instructions for providing a data dependency graph comprising a plurality of nodes, wherein each node of the plurality of nodes represents one of a plurality of instructions in the set of instructions;
   third instructions for analyzing the data dependency graph to determine whether any constrained resource is identified, wherein a constrained resource comprises a heavily-used resource;
   fourth instructions, responsive to determining that any constrained resource is identified, for determining whether any node of the plurality of nodes uses a constrained resource;
   fifth instructions, responsive to determining that any node of the plurality of nodes uses a constrained resource, for designating any node of the plurality of nodes that uses a constrained resource as being in a subset of nodes, wherein nodes of the subset of nodes comprise resource-constrained nodes; and
   sixth instructions for performing a scheduling attempt with the nodes of the subset of nodes scheduled with priority with respect to any nodes of the plurality of nodes that are not included in the subset of nodes, wherein the nodes of the subset of nodes are scheduled prior to any nodes of the plurality of nodes that are not included in the subset of nodes.

8. The computer program product of claim 7, wherein the fourth, fifth and sixth instructions are included in a swing modulo scheduling routine.

9. The computer program product of claim 7, wherein the sixth instructions comprises instructions for generating a modulo reservation table.

10. The computer program product of claim 7, further comprising:
seventh instructions, responsive to the fourth instructions for determining an initiation interval for the schedule.

11. The computer program product of claim 10, wherein the sixth instructions comprises instructions for attempting to schedule each of the plurality of nodes within a number of cycles equal to the initiation interval.

12. The computer program product of claim 7, wherein each node of the subset of nodes requires usage of a common execution unit, wherein the execution unit comprises a register.

13. The computer program product of claim 7, and further comprising:
seventh instructions for biasing selection of a first node of the subset of nodes to be scheduled as a highest priority of the subset of nodes.

14. The computer program product of claim 7, further comprising:
seventh instructions for reading the set of instructions at compile-time, wherein the set of instructions define an instruction loop.

15. A data processing system for scheduling a set of instructions for execution in a data processing system, comprising:
a memory containing an instruction set for scheduling the set of instructions for execution; and
a processing unit, responsive to execution of the instruction set, for reading the set of instructions; for providing a data dependency graph comprising a plurality of nodes, wherein each node of the plurality of nodes represents one of a plurality of instructions in the set of instructions; for analyzing the data dependency graph to determine whether any constrained resource is identified, wherein a constrained resource comprises a heavily-used resource; for, responsive to determining that any constrained resource is identified, determining whether any node of the plurality of nodes uses a constrained resource; for, responsive to determining that any node of the plurality of nodes uses a constrained resource, designating any node of the plurality of nodes that uses a constrained resource as being in a subset of nodes, wherein nodes of the subset of nodes comprise resource-constrained nodes; and for performing a scheduling attempt with the nodes of the subset of nodes scheduled with priority with respect to any nodes of the plurality of nodes that are not included in the subset of nodes, wherein the nodes of the subset of nodes are scheduled prior to any nodes of the plurality of nodes that are not included in the subset of nodes.

16. The data processing system of claim 15, wherein the set of instructions comprises a swing modulo scheduling routine.

17. The data processing system of claim 15, wherein the schedule comprises a modulo reservation table.

* * * * *